Nov. 16, 1926.

O. G. THURLOW 1,606,978

BACKWATER SUPPRESSING TYPE OF HYDROELECTRIC PLANT

Filed March 21, 1921     3 Sheets-Sheet 1

INVENTOR
Oscar G. Thurlow
BY
ATTORNEY

Nov. 16, 1926.
O. G. THURLOW
1,606,978
BACKWATER SUPPRESSING TYPE OF HYDROELECTRIC PLANT
Filed March 21, 1921.   3 Sheets-Sheet 2
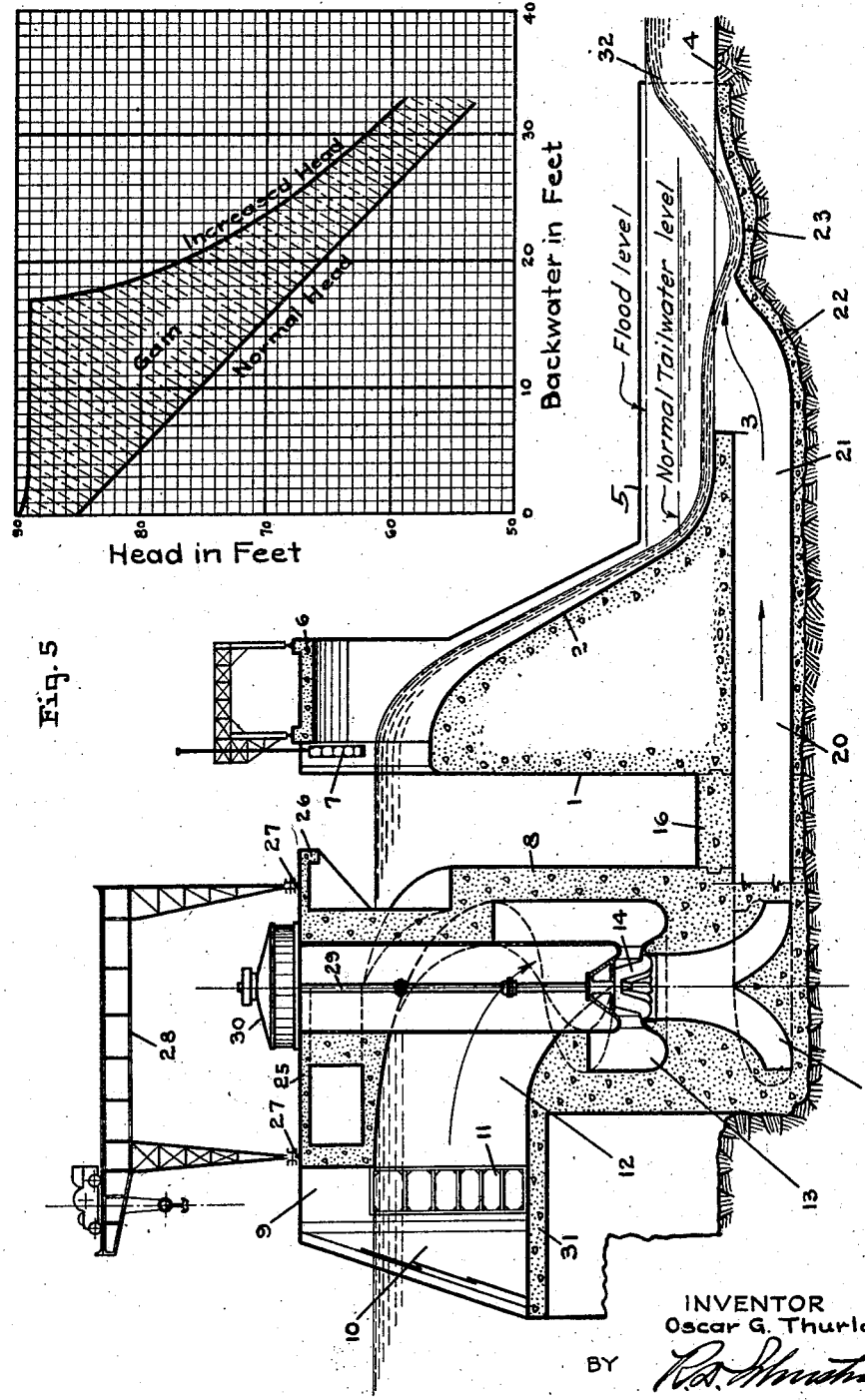
INVENTOR
Oscar G. Thurlow.
BY
ATTORNEY Nov. 16, 1926. 1,606,978
O. G. THURLOW
BACKWATER SUPPRESSING TYPE OF HYDROELECTRIC PLANT
Filed March 21, 1921  3 Sheets-Sheet 3
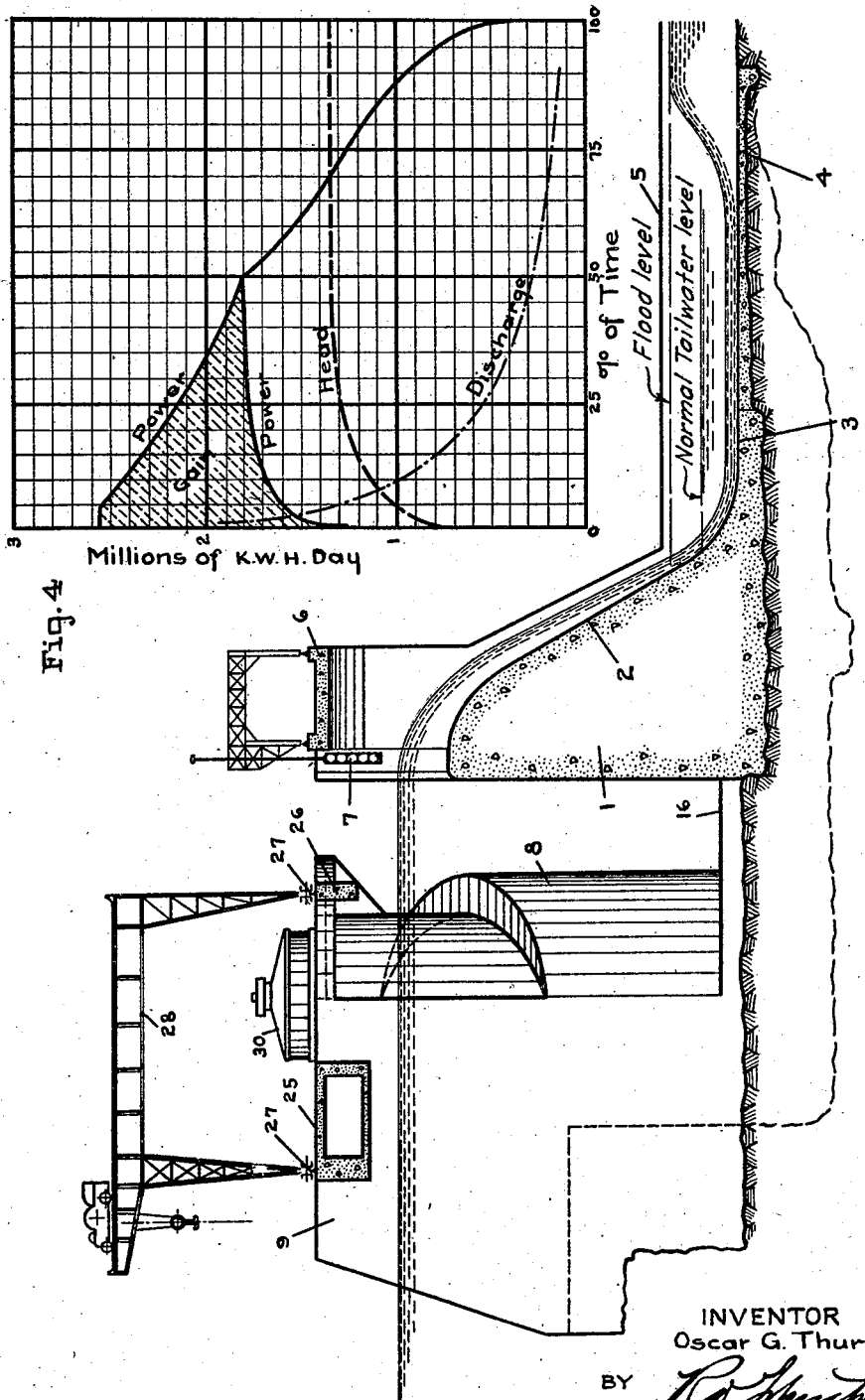
INVENTOR
Oscar G. Thurlow
BY
ATTORNEY Patented Nov. 16, 1926.

1,606,978

UNITED STATES PATENT OFFICE.

OSCAR G. THURLOW, OF BIRMINGHAM, ALABAMA.

BACKWATER-SUPPRESSING TYPE OF HYDROELECTRIC PLANT.

Application filed March 21, 1921. Serial No. 454,259.

My invention relates to a hydro-electric plant having for its object to remove the accumulation of backwater from over the draft tube discharge orifices so as to increase the effective head on the turbines by the removal of the negative, static, backwater head.

The purpose of my invention is to so apply the energy of the spillway water to the backwater as to hold the standing wave away from the draft tube outlets until the critical point is reached, which represents the maximum backwater head which the energy of the available amount of spillway water is capable of balancing.

My present invention constitutes an improvement on the backwater suppressing type of hydro-electric plant forming the subject matter of my pending renewal application Serial No. 514,829, filed November 12th, 1921, in which I disclose the same general principle for utilizing the energy of spillway water to reduce the level of the water in the tailrace at the outlets of the draft tubes leading from the turbines. In that construction I show the draft tubes discharging into a conventional type of tailrace which, as in the normal practice, is excavated in the bed of the stream, and I illustrate no rear guide walls on the apron to separate the jets for the different draft tubes.

In my present invention I extend the spillway apron further down stream and cause the draft tubes to discharge therethrough, preferably between the lateral spillway guide walls which cause the energy of the spillway water to be exerted only in the horizontal direction of its flow to hold back the standing wave away from the draft tube outlets, thus producing at that point back a tailwater level materially below that which would normally exist according to the present practice.

The most distinctive feature of my invention is to cause the draft tubes to discharge upwardly through the spillway apron so that the upwardly directed stream from the draft tubes and the horizontally projected stream from the spillway apron converge and commingle in such manner as to produce a jet of water flowing at high velocity and in the desired direction to most effectively repel and hold back the standing wave down stream away from the draft tube orifices.

A further object of my invention is to design the draft tube outlet with a reverse curve beyond the point of conjunction of the spillway jet with the draft tube stream, this reverse curve giving the combined streams a direction of flow against the head of backwater which is most effective in repelling the standing wave away from the draft tube orifices.

A further object of my invention is to design and arrange the spillway guide walls for the streams so that they will protect the streams on each side down to at least the low water position of the standing wave against the lateral inflow of water or eddy currents.

A further object of my invention is to simplify and improve the style of dam and spillway construction and of the turbine settings, my invention to this end comprising a continuous dam and spillway extending across the stream, or in such direction as conditions require, and having masonry turbine settings substantially independent of and set upstream relatively to the dam and spillway, with the draft tubes passing through the common masonry foundations of the setting and spillway. These independent upstream turbine settings have their wheel pits substantially balanced as to pressure and they may be arranged at suitable intervals along the entire length of the dam or along such portions thereof as conditions may indicate, and if desired the turbine settings may have arched connections to carry the gate controlling crane tracks. By this construction an expensive power house construction is practically eliminated and the hydro-electric plant, as a whole, comprises a simple type of spillway dam with upstream masonry projections at intervals which form turbine settings and represent in effect a series of independent inexpensive power plant units.

My invention further comprises the novel details of construction and arrangements of parts, which in their preferred embodiment only are illustrated in the accompanying drawings, in which:—

Fig. 2 is a vertical sectional view taken on the line A—A of Fig. 1.

Fig. 3 is a similar view taken on the section line B—B of Fig. 1.

Fig. 4 is a typical chart showing the average increased power obtained over present standard practice; and Fig. 5 is a chart showing the increase in effective head obtained by suppressing the backwater head on the draft tubes.

Similar reference numerals refer to similar parts throughout the drawings.

Figure 1:
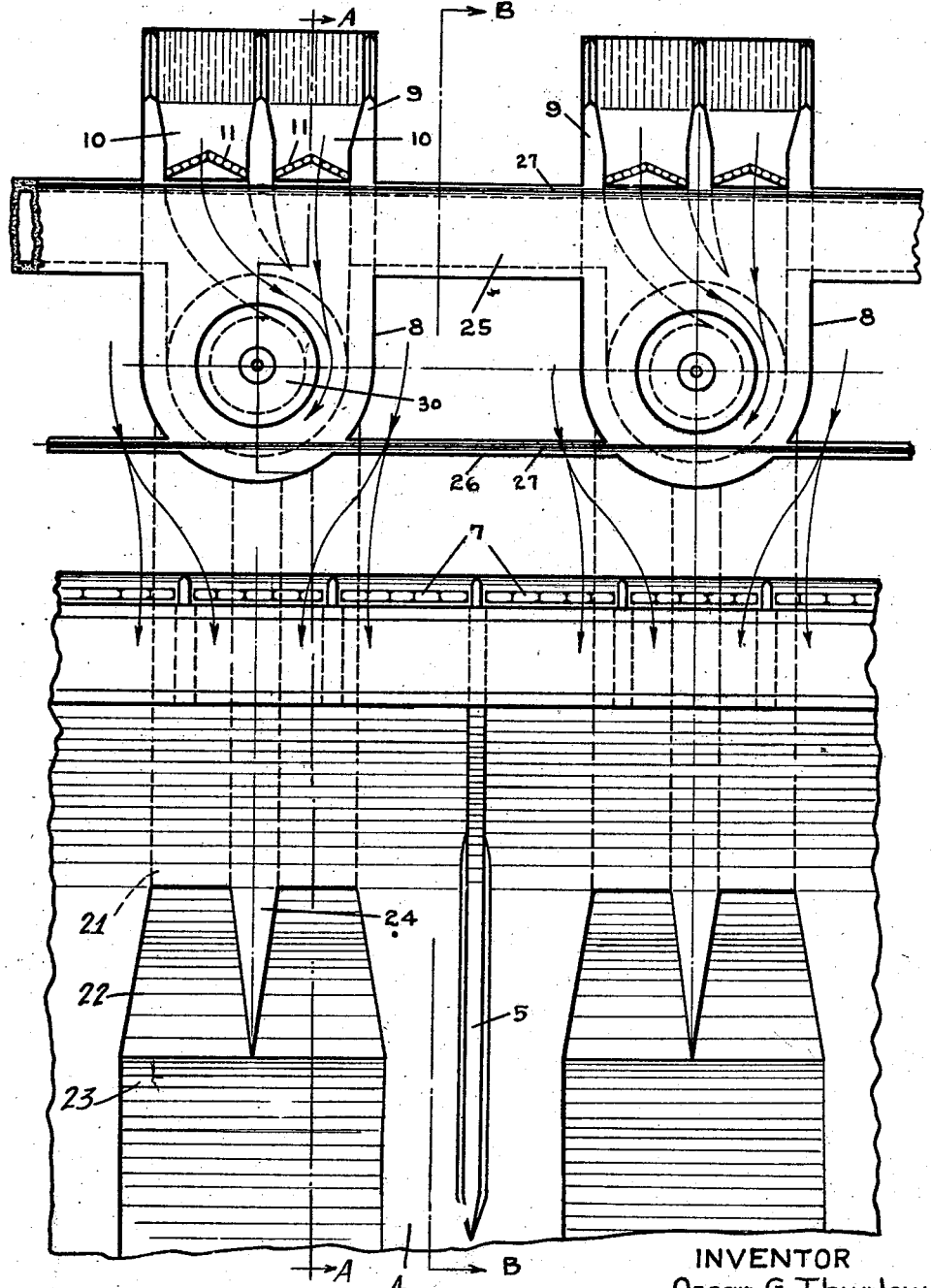
Fig. 1 is a plan view of a section typical of the whole dam and spillway with several turbine settings shown and is typical of the power plant construction which may extend the entire length of the dam.

In the embodiment illustrated, 1 represents a dam and spillway having its down stream side 2 of ogee section terminating in a horizontal extension forming an apron 3. The down stream extension 4 of the apron extends down stream beyond the draft tube discharge orifices. The spillway and its apron are provided with division walls 5 which extend from the bridge 6 of the dam downwardly along the spillway face 2 and down stream along the apron 4 to a point beyond the discharge ends of the turbine draft tubes. The water flowing over the whole spillway is controlled by gates 7 in the manner well understood in this art and can therefore be directed between the desired walls 5 under low water conditions and its quantity can be regulated.

For each turbine I provide a separate masonry setting 8 set upstream from the dam and provided with upstream masonry projections 9 forming water inlet passages or penstocks 10 which are controlled by gates 11 which permit the water to flow through the helical ducts 12 to the wheel pit 13 and through the wheel 14 into the draft tubes 15, which, as illustrated, are of the hydro-cone type but may be of any desired design. The draft tubes of each turbine extend through the foundation of its setting 8 and through a foundation section 16 connecting such setting 8 and the dam 1 through which they pass the end 21 of the draft tube. This end 21 is provided with a bottom surface which curves upwardly at 22 so that the draft tube discharges upwardly through the horizontal extension 4 of the apron and this curved bottom 22 rises approximately to the level of the river bed 3 and may then be given a reverse curve at 23 which gradually rises to the level of the extension 4 of the apron, reaching this level near the end of the apron.

As illustrated, the draft tube may be divided by a vertical central web 24.

The turbine settings 8 are preferably integral masonry units and may be connected by masonry arches 25 and 26 which extend continuously above the several structures so as to carry the tracks 27 upon which the crane 28 for operating the gates 11 can travel. The water turbine 14, by means of a shaft 29, drives a covered electric generator 30 mounted on top of the masonry setting 8.

In operation, the gates 11 being set to admit the water to the turbines, the gates 7 and 19 are opened and the water overflows down the ogee surface 2 of the spillway and through the duct 18. As the stream of water is discharged in a horizontal jet over the apron extension 4 it impinges on the stream of water discharged from the draft tube section 21, this latter stream having an upward flow by reason of the bottom curved wall 22 of the draft tube. The result of the confluence of these two converging streams is to provide a joint jet having substantially the direction of flow of the curved bottom section 23 of the draft tube which may be shaped to cause this combined jet to flow upwardly at an angle as it is deflected therefrom. This jet is the means relied upon to suppress or hold back the standing wave indicated at 32 so that the same is forced away from the discharge end of the draft tube, thus maintaining the effective head on the turbines unaffected by the fact that the tailwater level may rise from the normal level, shown in Fig. 2, to the flood level also shown in that figure, during which rise the jet will prevent the standing wave advancing and breaking over the discharge end of the draft tubes. As the flood level rises, this standing wave advances upstream toward the draft tube discharge orifices until the critical point is reached, which represents the maximum backwater head that the energy of the fixed amount of spillway water available is capable of balancing. When the backwater level increases above this point the standing wave breaks and the backwater flows over the draft tube outlets, this break, due to an increase of the backwater above the critical point, is quite sudden and is accompanied by a sudden decrease in the turbine head which up to this point have remained practically constant and unaffected by the previous rise in the backwater level.

Assuming, according to the theory of my backwater suppressor that the increase of the effective head on the turbine as the backwater varies, is due to the removal of the backwater from over the draft tube orifices, the maximum height of backwater which a given amount and head of spillway water will handle—that is the backwater head at the critical point—may be calculated as follows: Where $h$ equals the total depth of the tailwater column to be balanced by the overfall, H equals the head of water above the tailwater, and $d$ equals the depth of water over the spillway, the value of $h$ calculated from the formula $$h = .83\sqrt{d^{\frac{3}{2}}H^{\frac{3}{2}}}$$

is shown for different values of $d$ in the following table:

| $d$. | $h$ observed. | $h$ calculated. |
|---|---|---|
| 4″ | 6.″ | 6.5″ |
| 5″ | 7.75″ | 8.05″ |
| 6″ | 8.75″ | 8.9″ |
| 7″ | 9.75″ | 10.″ |
| 7½″ | 11.″ | 10.6″ |

This table shows that the observed and calculated results agree within the limits of reasonable errors.

In Fig. 5 the result of observed tests are tabulated and platted in the form of a curve wherein the line marked normal head shows the gradual and uniform reduction in head as the backwater rises in height, whereas the other curve marked "Increased head" shows the function of the spillway water flowing over the draft tube outlets in removing the backwater down stream away from these outlets and gives a marked initial increase in head which remains substantially constant up to the limits of the energy of the spillway jet to balance the head of backwater. In the plat this occurs with a backwater depth of 17 feet. When this point is passed the backwater flows over the draft tube orifices producing a sudden decrease in the effective head on the turbine by the amount of backwater then covering the draft tube outlets.

In the chart shown in Fig. 4, I show a plat which reading vertically indicates millions of k. w. h. per day, and reading along the horizontal line indicates the percentage of a time interval of one year. The dotted curve marked "Head" indicates the effective head on the turbine and the dot and dash curve marked "Discharge" indicates the volume of discharge for varying percentages of the time, while the power curves show in the shaded zone the net gain in power by reason of my maintaining the effective head on the turbine substantially constant up to the critical backwater flood level and as thus platted it represents a gain in power of approximately 14.7 per cent.

It is important to note that the spillway gates 7 are available when there is a limited supply of spillway water to direct this over the crest of the dam opposite the draft tube openings which are functioning, it being intended that spillway gates which are not above draft tube outlets should be opened only at such times, as in case of severe floods, when the spillway gates above the draft tube outlets are incapable of taking care of the river flow.

According to the formula previously developed the maximum head increase is accomplished at the critical point of tailwater or when $$h = .83\sqrt{d^{\frac{3}{2}}H^{\frac{3}{2}}} = .83 d^{\frac{3}{4}}H^{\frac{3}{4}}.$$

From this it will be seen that while the head increase varies with the one-fourth power of the height of the dam it varies with the three-fourths power of the depth or amount of water flowing over the spillway. This shows that it is important to keep the depth of water flowing over the draft tube outlets sufficient to balance the given head of backwater, which can only be obtained with gates to conserve this spillway water by preventing the waste of any necessary portion thereof over other parts of the dam. In the usual hydro-electric practice it is ordinarily impossible, because of the varying demand for power during the light and dark hours of the day, to maintain an even load on the generators. The gates provided in my backwater suppressor are of importance in conserving the spillway water and using it at times when the maximum load is demanded.

Having thus described my invention, what I claim as new and desire to secure by Letters Patent, is:—

1. In a hydraulic power plant, a dam having a spillway with a substantially horizontal apron at its base and spaced walls extending down stream over the apron to form channels which divide the overfall flowing over the apron into separate streams, crest gates on the dam and spillway to control and concentrate the overflow into the desired channels and turbines having draft tubes penetrating the dam and spillway apron at a point between the walls defining the path of its respective spillway stream.

2. In a hydraulic power plant, a dam having a spillway with a substantially horizontal apron extending from its base a substantial distance down stream, spaced walls extending in the direction of flow down the spillway and along over the apron to form channels dividing the overfall on the apron into separate streams, spillway gates controlling the overfall to each channel, and turbines having draft tubes which penetrate the dam and open upwardly through the spillway apron between the walls that confine its respective spillway stream.

3. In a hydraulic power plant, a spillway having an apron at its base, an individual turbine setting disposed upstream and disconnected from the dam, a wheel pit in the setting, and a hydro-cone type of draft tube penetrating the dam and discharging upwardly through the spillway apron.

4. In a hydraulic power plant, a dam having a spillway with an apron at its base extended substantially down stream to form a tailrace, lateral walls for said tailrace rising vertically to exclude the backwater up to a predetermined level from flowing over the tailrace, a water turbine having its draft tube opening through said apron between said walls near the base of the spillway, and means to concentrate the overflow water and direct it in a jet over said draft tube orifice to oppose by the energy of its mass and velocity the approach of the standing wave in the tailrace towards said draft tube orifice.

5. In a hydraulic power plant, a dam having a spillway with an elongated substantially horizontal apron at its base, a turbine having its draft tube discharge orifice opening through said apron near the spillway, means to concentrate and control the volume of overflow water so that it will pass in a stream over said draft tube orifice, and means within predetermined limits to prevent the disturbance of said stream above and for a substantial distance below the draft tube orifice by the lateral inflow of backwater.

6. The combination with a dam and a hydraulic motor unit, of means for maintaining a substantially constant effective head of water at high or low-water levels, which consists in an inclined spillway having a hollowed concave surface at the foot of the dam in continuation of the spillway, and an apron continuing said curved surface upwardly to a point approaching the normally low-water level on the down stream side of the dam, and means to conduct the tailwater of said unit to and to discharge it at a point substantially on a level with the lowest portion of said curved surface.

In testimony whereof I affix my signature.

OSCAR G. THURLOW.